(12) United States Patent
Karaca et al.

(10) Patent No.: US 10,206,166 B2
(45) Date of Patent: Feb. 12, 2019

(54) SYSTEMS AND METHODS FOR SELECTING AN OPTIMUM COMMUNICATION ROUTE IN A WIRELESS NETWORK

(71) Applicant: AIRTIES KABLOSUZ ILETISIM SAN. VE DIS TIC. A.S., Istanbul (TR)

(72) Inventors: Mehmet Karaca, Istanbul (TR); Firat Birlik, Istanbul (TR); Eren Soyak, Istanbul (TR); Muharrem Sarper Gokturk, Istanbul (TR)

(73) Assignee: AIRTIES KABLOSUZ ILETISM SAN. VE DIS TIC. A.S., Istanbul (TR)

( * ) Notice: Subject to any disclaimer, the term of this patent is extended or adjusted under 35 U.S.C. 154(b) by 0 days.

(21) Appl. No.: 14/747,438

(22) Filed: Jun. 23, 2015

(65) Prior Publication Data

US 2015/0373636 A1 Dec. 24, 2015

Related U.S. Application Data

(60) Provisional application No. 62/015,853, filed on Jun. 23, 2014.

(30) Foreign Application Priority Data

Dec. 12, 2014 (GB) .................................. 1422183.2

(51) Int. Cl.
*H04W 4/00* (2018.01)
*H04W 48/20* (2009.01)
(Continued)

(52) U.S. Cl.
CPC ............. *H04W 48/20* (2013.01); *H04L 43/12* (2013.01); *H04L 45/125* (2013.01);
(Continued)

(58) Field of Classification Search
CPC ..... H04W 48/20; H04W 24/10; H04W 48/18; H04W 40/12; H04W 40/36; H04W 88/08
(Continued)

(56) References Cited

U.S. PATENT DOCUMENTS

| 2007/0072600 | A1* | 3/2007 | Cho | ....................... | H04L 45/123 |
| | | | | | 455/423 |
| 2008/0108369 | A1* | 5/2008 | Visotsky | .............. | H04B 7/2606 |
| | | | | | 455/455 |

(Continued)

FOREIGN PATENT DOCUMENTS

| EP | 1503544 A2 | 2/2005 |
| EP | 1734705 A2 | 12/2006 |

(Continued)

OTHER PUBLICATIONS

Intellectual Property Office Search Report for Application No. GB 1422183.2 dated Jan. 26, 2015.

*Primary Examiner* — Mang Hang Yeung
(74) *Attorney, Agent, or Firm* — Harness, Dickey & Pierce, P.L.C.

(57) ABSTRACT

In one example embodiment, a device includes a processor. The processor is configured to determine a plurality of data transmission rates between at least one client, an access point and the device belonging to a wireless network, determine a best communication route, from among available communication routes for the at least one client to communicate with the access point based on the determined plurality of data transmission rates and direct the at least one client to communicate with the access point via the determined best communication route.

19 Claims, 12 Drawing Sheets

(51) Int. Cl.
  *H04W 24/10*  (2009.01)
  *H04W 48/18*  (2009.01)
  *H04L 12/26*  (2006.01)
  *H04L 12/729*  (2013.01)
  *H04W 40/12*  (2009.01)
  *H04W 88/08*  (2009.01)
  *H04W 40/36*  (2009.01)

(52) U.S. Cl.
  CPC ........... *H04W 24/10* (2013.01); *H04W 40/12* (2013.01); *H04W 48/18* (2013.01); *H04W 40/36* (2013.01); *H04W 88/08* (2013.01)

(58) Field of Classification Search
  USPC .......................................................... 370/332
  See application file for complete search history.

(56) References Cited

U.S. PATENT DOCUMENTS

| | | | | |
|---|---|---|---|---|
| 2009/0129272 A1* | 5/2009 | Padfield | ................ | H04L 1/0002 370/235 |
| 2010/0189012 A1* | 7/2010 | Shibuya | ................ | H04W 76/02 370/254 |
| 2015/0319407 A1* | 11/2015 | Frankel | ................... | H04N 7/14 348/14.02 |

FOREIGN PATENT DOCUMENTS

| | | |
|---|---|---|
| KR | 20120044840 A | 5/2012 |
| WO | WO-2007104920 A1 | 9/2007 |

\* cited by examiner

SYSTEMS AND METHODS FOR SELECTING AN OPTIMUM COMMUNICATION ROUTE IN A WIRELESS NETWORK

This application claims priority under 35 U.S.C. § 119 to U.S. application No. 62/015,853 filed on Jun. 23, 2014, and also claims priority under 35 U.S.C. § 119 to Great Britain Patent Application No. 1422183.2 filed on Dec. 12, 2014, the entire disclosure of each of which is hereby incorporated by reference.

BACKGROUND

IEEE 802.11 based Wireless Local Area Networks (WLANs) have been deployed in many locations such as homes, schools, hospitals and cafes. WLANs enable users to connect to the internet with great flexibility and at a low-cost. However, due to harmful effects of wireless medium such as walls between transmitters and receivers and the fading of signals, the throughput achieved by clients in a given WLAN may be sub-optimal. Furthermore, a client may experience some level of loss of connection from the access point (AP) to which the client is connected. This is known as the wireless coverage problem which causes distortion in the wireless communication between clients and the APs. Hence, it is important to find efficient and low-cost methods which provide full connectivity in WLANs by extending the range of connectivity between the clients and the APs.

One solution for extending this range, is to increase the transmit power of the transmitting nodes (e.g., the AP(s) and/or the client(s)) in the network. However, this solution is inefficient for two reasons. First reason is that increasing transmit power causes more energy consumption. The second reason is that higher transmit power generates more interference in the network.

SUMMARY

Some example embodiments relate to methods and apparatuses for a client of a wireless network to select an access point for data transmission according to the end-to-end throughout performance when there are universal repeater and wireless mesh points in wireless communication networks.

In one example embodiment, a device includes a processor. The processor is configured to determine a plurality of data transmission rates between at least one client, an access point and the device belonging to a wireless network, determine a best communication route, from among available communication routes for the at least one client to communicate with the access point based on the determined plurality of data transmission rates and direct the at least one client to communicate with the access point via the determined best communication route.

In yet another example embodiment, the execution of the computer-readable instructions causes the processor to direct the at least one client to communicate with the access point by one of providing the best communication route for the at least one client through the device or broadcasting a disassociation message to the access point and the at least one client indicating that the device does not provide the best communication route.

In yet another example embodiment, the execution of the computer-readable instructions causes the processor to determine the best communication route based on an end-to-end throughput of data from the at least one client to the access point via each of the available communication routes.

In yet another example embodiment, the plurality of data transmission rates include at least a first data transmission rate and a second data transmission rate, the first data transmission rate being a direct data transmission rate between the at least one client and the access point and the second data transmission rate being a data transmission rate between the at least one client and the access point via the device.

In yet another example embodiment, the execution of the computer readable instructions causes the processor to determine the second data transmission rate based on the following formula:

$$R = \left(\frac{1}{r_1} + \frac{1}{r_2}\right)^{-1}$$

where R is the second data transmission rate, $r_1$ is a rate of data transmission between the device and the access point and $r_2$ is a rate of data transmission between the at least one client and the device.

In yet another example embodiment, the execution of the computer readable instructions causes the processor to determine the best communication route by comparing the first data transmission rate with the second data transmission rate, and selecting, based on the comparing, a communication route associated with one of the first data transmission rate and the second data transmission rate as the best communication route.

In yet another example embodiment, upon the processor determining that the first data transmission rate is greater than the second data transmission rate, the execution of the computer readable instructions causes the processor to select the communication route associated with the first data transmission rate.

In yet another example embodiment, the execution of the computer readable instructions causes the processor to determine r1 based on a number of beacon packets transmitted by the access point and received by the device.

In yet another example embodiment, upon the wireless network including another device, the plurality of data transmission rates further include a third communication route and a fourth communication route, the third data transmission rate being a data transmission rate between the at least one client and the access point via the other device and the fourth data transmission rate being a data transmission rate between the at least one client and the access point via the device and the other device.

In yet another example embodiment, the execution of the computer readable instructions causes the processor to determine the best communication route by comparing the first through fourth data transmission rates, and selecting a communication route associated with one of the first through fourth data transmission rates, as the best communication route.

In yet another example embodiment, the execution of the computer readable instructions causes the processor to determine the plurality of transmission rates by generating diagnostic traffic between the access point and the client, and recording estimated potential downlink rates between the access point and the client.

In yet another example embodiment, the execution of the computer readable instructions causes the device to broadcast the potential downlink rates.

In yet another example embodiment, the execution of the computer readable instructions causes the device to send the potential downlink rates to a further access point.

In yet another example embodiment, the execution of the computer readable instructions causes the processor to determine the plurality of data transmission rates by transmitting a probe request to the at least one client, and receiving a probe response from the at least one client, the probe response including information on a rate of data transmission between the at least one client and the access point.

In yet another example embodiment, the execution of the computer readable instructions causes the processor to determine whether the transmitted probe request is received by the at least one client, and retransmit the probe request if the processor determines that the at least one client has not received the transmitted probe request.

In yet another example embodiment, the execution of the computer readable instructions causes the device to transmit special broadcast packet with end-to-end transmission rate information to a further access point.

In yet another example embodiment, the device is a mesh access point configured to operate in a same manner as the access point and connect wirelessly to another access point.

In yet another example embodiment, the device is a universal repeater, and the wireless network operates based on IEEE 80.2.11 standard.

In yet another example embodiment, the available communication routes enable the at least one client to communicate with at least one of a gateway, a wireless router, a satellite receiver, a video recorder set-up box and a network-attached storage device.

In one example embodiment, a wireless network includes at least one device including a memory having computer readable instructions stored therein and a processor, wherein the execution of the computer readable instructions causes the processor to determine a plurality of data transmission rates between at least one client, an access point and the at least one device belonging to the wireless network, determine a best communication route, from among available communication routes, for the at least one client to communicate with the access point based on the determined plurality of data transmission rates, and direct the at least one client to communicate with the access point via the determined best communication route.

In one example embodiment, a method of determining a best communication route includes determining, at a processor, a plurality of data transmission rates between at least one client, an access point and the at least one device belonging to a wireless network, determining, at the processor, the best communication route, from among available communication routes, for the at least one client to communicate with the access point based on the determined plurality of data transmission rates, and directing the at least one client to communicate with the access point via the determined best communication route.

In yet another example embodiment, the available communication routes enable the at least one client to communicate with at least one of a gateway, a wireless router, a satellite receiver, a video recorder set-up box and a network-attached storage device.

In yet another example embodiment, the directing directs the at least one client to communicate with the access point by one of providing the best communication route for the at least one client through the device or broadcasting a disassociation message to the access point and the at least one client indicating that the device does not provide the best communication route.

In yet another example embodiment, the plurality of data transmission rates include at least a first data transmission rate and a second data transmission rate, the first data transmission rate being a direct data transmission rate between the at least one client and the access point and the second data transmission rate being a data transmission rate between the at least one client and the access point via the device.

In yet another example embodiment, the method further includes determining the second data transmission rate based on the following formula:

$$R = \left(\frac{1}{r_1} + \frac{1}{r_2}\right)^{-1}$$

where R is the second data transmission rate, $r_1$ is a rate of data transmission between the device and the access point and $r_2$ is a rate of data transmission between the at least one client and the device.

In yet another example embodiment, he determining the best communication route includes comparing the first data transmission rate with the second data transmission rate, and selecting, based on the comparing, a communication route associated with one of the first data transmission rate and the second data transmission rate as the best communication route.

In yet another example embodiment, upon determining that the first data transmission rate is greater than the second data transmission rate, the selecting selects the communication route associated with the first data transmission rate.

In yet another example embodiment, the method further includes determining r1 based on a number of beacon packets transmitted by the access point and received by the device.

In yet another example embodiment, upon the wireless network including another device, the plurality of data transmission rates further include a third communication route and a fourth communication route, the third data transmission rate being a data transmission rate between the at least one client and the access point via the other device and the fourth data transmission rate being a data transmission rate between the at least one client and the access point via the device and the other device.

In yet another example embodiment, the determining the best communication route determines the best communication route by comparing the first through fourth data transmission rates, and selecting a communication route associated with one of the first through fourth data transmission rates, as the best communication route.

In yet another example embodiment, the determining the plurality of data transmission rates determines the plurality of transmission rates by generating diagnostic traffic between the access point and the client, and recording estimated potential downlink rates between the access point and the client.

In yet another example embodiment, the method further includes broadcasting the potential downlink rates.

In yet another example embodiment, the method further includes sending the potential downlink rates to a further access point.

In yet another example embodiment, the determining the plurality of data transmission rates determines the plurality of data transmission rates by transmitting a probe request to the at least one client, and receiving a probe report from the at least one client, the probe report including information on a rate of data transmission between the at least one client and the access point.

In yet another example embodiment, the transmitting includes determining whether the transmitted probe request is received by the at least one client, and retransmitting the probe request if the at least one client has not received the transmitted beacon request frame.

In yet another example embodiment, the method further includes transmitting a special broadcast packet with end-to-end transmission rate information to a further access point.

In yet another example embodiment, the device is a mesh access point configured to operate in a same manner as the access point and connect wirelessly to another access point.

In one example embodiment, a non-transitory computer readable medium including a computer program product, the computer program product comprising instructions, which when executed by a processor, causes the processor to determine a plurality of data transmission rates between at least one client, an access point and the device belonging to a wireless network, determine a best communication route, from among available communication routes, for the at least one client to communicate with the access point based on the determined plurality of data transmission rates, and direct the at least one client to communicate with the access point via the determined best communication route.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
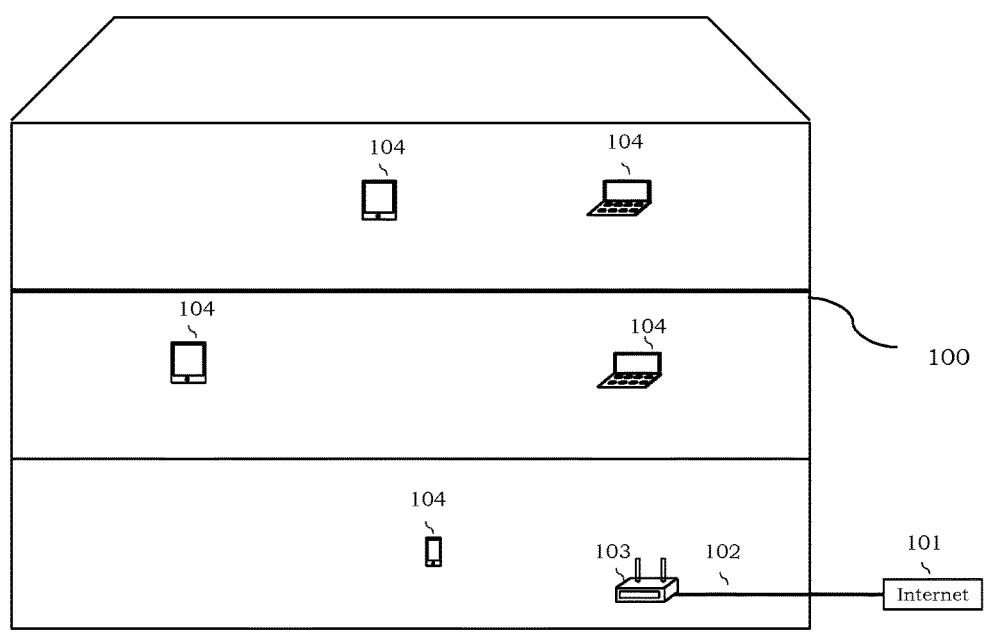
FIG. 1 is a block diagram illustrating a wide local area network deployed in a home setting, according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

An alternative solution to increasing the transmit power to address connectivity issues and data throughput, as described above, is to transmit a signal by using a second transmitter instead of transmitting the signal directly to the receiver. Transmitting a signal using a second transmitter may be referred to as a two-hop transmission. For example, a two-hop transmission may be implemented by retransmitting a signal by a Universal Repeater (UR) which is deployed at a proper place in a WLAN. Another example would be to build a wireless mesh network by using multiple Mesh Points (MPs), through the use of which data may be transmitted to a gateway for accessing the internet.

In the above examples, a client typically associates with the closest transmitter that provides the maximum signal strength. However, a signal strength based association may be inefficient for two-hop data transmission in terms of data throughput performance, and may significantly degrade the overall throughput of the network. Such degradation is basically due to the fact that a two-hop data transmission necessitates a double transmission of the same data, which introduces some additional delay thus reducing the overall throughput in the WLAN. In the most current implementations of two-hop data transmission schemes, a client is aware of only the data transmission rate at one side of the two-hop transmission, namely the data transmission rate between the client and a UR or a MP. However, the client is unaware of the data transmission rate between the UR or the MP and the wireless gateway (e.g., the access point (AP)). Although a data transmission rate at one-side of a two-hop data transmission is high, the rate at the other side may reduce the overall end-to-end data transmission rate between the client and the AP. Hence, the two-hop data transmission may not always result in a higher data throughput. Therefore, various data transmission rates need to be considered prior to choosing the two-hop data transmission for communication between the client and the AP. These concepts will be further described below.

FIG. 1 is a block diagram illustrating a wide local area network deployed in a home setting, according to an example embodiment. The home network 100 is an IEEE 802.11 WLAN. The WLAN 100 enables connection to the internet 101 via the AP 103 through a gateway. The connection 102 between the AP 103 and the internet 101 may be a wired communication via for example, a fiber optics cable. Various consumer electronic devices including, but not limited to, mobile devices, handheld electronic devices, laptops, etc., (hereinafter collectively referred to as client 104), located on different floors of a home, may connect to the internet 101 by establishing a connection with the AP 103.

Wireless communications between the AP 103 and the client 104 may be highly dynamic nature due to super composition of multiple effects such as path-loss, multi-path fading, shadowing, etc. These effects may significantly degrade the exchange of data by the client 104 especially when high rate of data transmission is required (e.g., during a streaming of a video). Hence, a minimum level of signal strength at the client 104 must be provided so that a seamless communication with a desirable data transmission rate can be supported.

In the home network 100 as shown in FIG. 1, there may be multiple floors with walls, as a result of which the effect of path-loss and fading may increase. In such scenarios, the distance between the AP 103 and the client 104 may be too long for a direct connection to be established.

Figure 2:
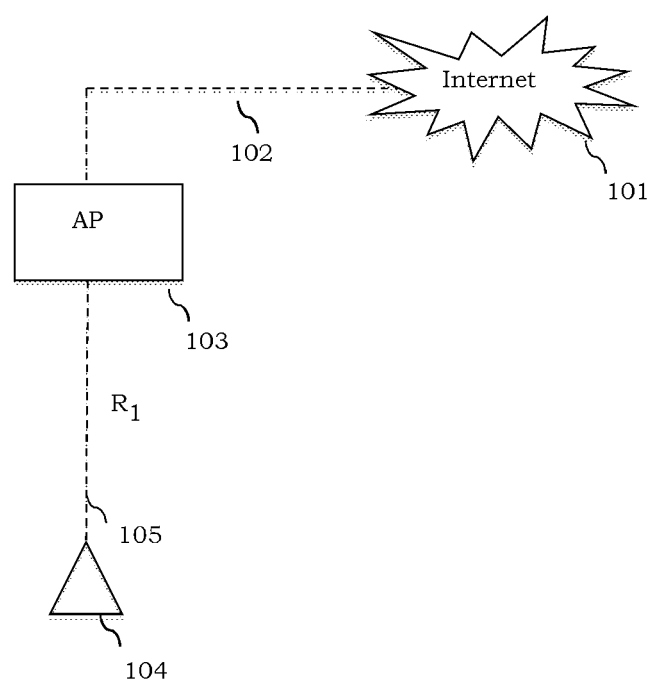
FIG. 2 illustrates a simplified schematic diagram of the home network of FIG. 1 and the associated data transmission rate, according to an example embodiment.

FIG. 2 illustrates a simplified schematic diagram of the home network of FIG. 1 and the associated data transmission rate, according to an example embodiment. As shown in FIG. 2, the client 104 is connected to the internet 101 via the AP 103. Link 105 is the communication link (e.g., a wireless communication link) between the client 104 and the AP 103 with a rate of data transmission R1. Link 102 is the communication link between the AP 103 and the internet 101.

In a typical WLAN, the communication between the AP 103 and the client 104 of FIG. 2 is performed as follows. Whenever the AP 103 starts operation, it transmits a beacon packet periodically in order to announce its presence to the client 104. The beacon packet is one of the management packets implemented in IEEE 802.11 based WLANs, which contains all necessary information about the network including but not limited to the modulation and coding schemes and encryption types supported by the AP 103.

When the client 104 receives a beacon packet from the AP 103, IEEE 802.11 based authentication (e.g., Wi-Fi Protected Access (WPA) 1 or WPA 2) is followed so that the attachment of the client 104 to the WLAN is enabled. Authentication phase provides a proof of identity for the client 104 to gain access to the WLAN. Once the client 104 is authenticated, it associates with the AP 103 so that the AP can deliver data to the client 104. After the association phase is completed, the client 104 is ready to transmit/receive data to/from the AP 103. According to IEEE 802.11 standard rules and due to the limitation in the current hardware implementation a client may associate with a single AP at a time.

The beacon packets enable the client 104 to measure the received signal strength of the wireless connection between the AP 103 and the client 104, which is known as Received Signal Strength Indication (RSSI) value. In one implementation, if the client 104 receives more than one beacon packets transmitted by different APs, then the client associates with the AP which provides the maximum RSSI value. In one example embodiment and due to the problems such as fading and path-loss, the corresponding RSSI value may be too low and, consequently the transmission rate $R_1$ may be too low to support a video streaming.

In one example embodiment and in order to address the insufficient data transmission rate, a UR may be introduced within a wireless network such as the home wireless network 100 of FIG. 1, as will be described below.

Figure 3:
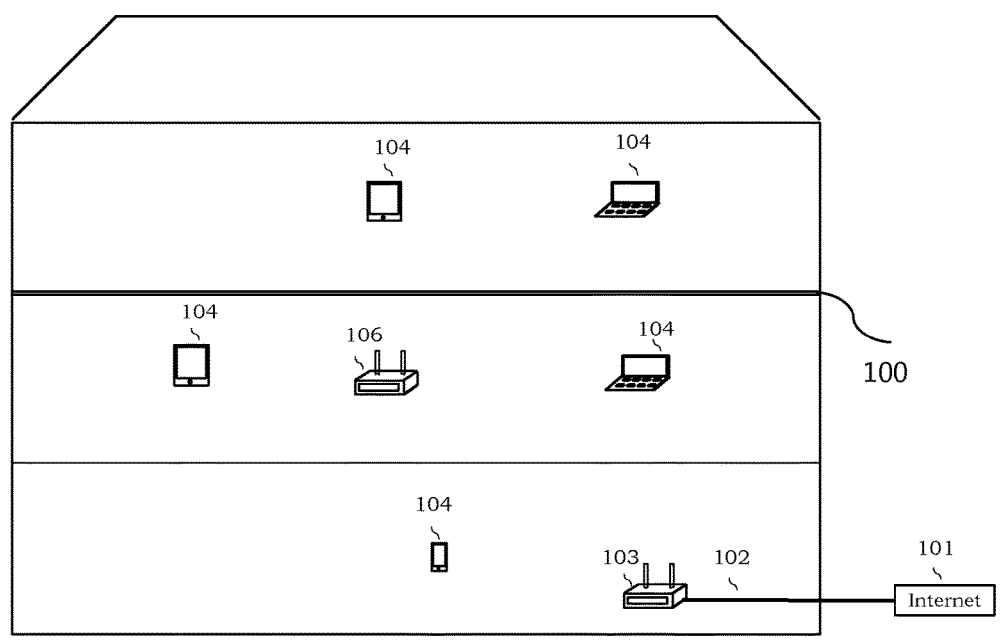
FIG. 3 is a block diagram illustrating a home network with a Universal Repeater, according to an example embodiment.

FIG. 3 is a block diagram illustrating a wide local area network with a Universal Repeater deployed in a home setting, according to an example embodiment. The home network 100 shown in FIG. 3 is the same as that shown in FIG. 1 and described above, except the UR 106. In one example embodiment, the UR 106 is introduced into the home network 100 to mitigate the inefficiencies of direct data transmission rate between the client 104 and the AP 103, as described above.

In one example embodiment, the UR 106 first associates with the AP 103 and then starts its own operation as another AP. The UR 106 transmits beacons packets with the same information as the AP 103. The only difference between the beacon packets transmitted by the UR 106 and the AP 103 is Basic Service Set Identification (BSSID) value, which is unique for each AP.

Figure 4:
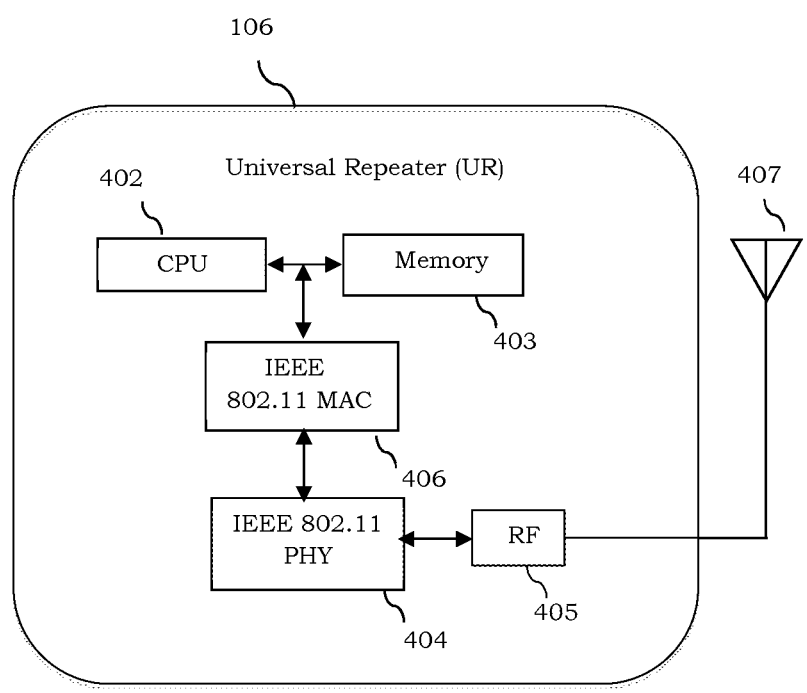
FIG. 4 is a block diagram of the internal components of a universal repeater, according to an example embodiment.

FIG. 4 is a block diagram of the internal components of a universal repeater, according to an example embodiment. FIG. 4 illustrates the UR 106. The UR 106 has a central processing unit (CPU) 402, a memory 403, a Physical Layer (PHY) 404, a Radio Frequency Chip (RF) 405 and a Medium Access Control (MAC) chip 406 with antennas 407. In one example embodiment, these components of the UR 106 are connected by a bus enabling a bidirectional data communication. In one example embodiment, the CPU 402 reads a software program from the memory 403 and executes the program to implement the functions of the UR 106, which will be further described below. The memory 403 temporary stores data, which is required during the execution of the program. The CPU 402 and the memory 403 may be configured as separate components or may be configured as one.

Wireless communication using the UR 106 is realized by the PHY 404, the RF chip 405 and MAC 406. The MAC chip 406 enables the client(s) such as client 104 and an AP such as the AP 103, to access the wireless medium according to pre-defined rules of the IEEE 802.11 standard. The RF chip 405 converts data packets for communication, to radio waves, which are then transmitted over the wireless medium via antenna 407. In one example embodiment, the software program for implementing the functions of the UR 106 may be embedded within the MAC chip 406. The PHY 404 may communicate with the MAC chip 406 and the RF chip 405 and may perform functions including, but not limited to, transmission/reception to and from the wireless medium, signal modulation and signal encoding.

IEEE 802.11k standard defines Beacon Request Frame (BRqF) (hereinafter the BRqF may also be referred to as a probe request) which enables the AP 103 and/or the UR 106 to request the client 104 to report various measurements based on a set of beacon packets the client 104 receives on a specified communication channel from the AP 103. Either active or passive scanning may be used for measurements by the client 104. IEEE 802.11k standard also defines Beacon Response Frame (BRsF), which is used by client 104 to report the measurement results back to the AP 103 and/or the UR 106 (hereinafter the BRsF may also be referred to as a probe response). The Received Channel Power Indicator (RCPI) field in BRsF indicates the power of the beacon packets or probe response frames collected by the client 104. In one example embodiment, the RCPI value is used as RSSI value.

In one example embodiment, whenever the client 104 receives a BRqF from the AP 103 and/or the UR 106, the client 104 starts the measurement process by collecting beacon packets or probe responses from all possible APs and URs. Then the client 104 logs collected beacon packets or probe responses and reports the logged beacon packets or probe responses back to the AP 103 and/or the UR 106 by using BRsF and without requiring further measurements. The BRsF provides RSSI values, BSSID, beacon interval and additional parameters which are based on detected beacon packets or probe responses. IEEE 802.11k standard defines other packets and measurement schemes, which may be used instead of the BRqF and BRsF. Such packets and measurement schemes include Frame Request and Response packets. For example, protocols to measure estimated downlink rates between each access point and each client are used to generate diagnostic traffic and to observe the actual rate of data transfer between access points and/or universal repeaters. Advantageously, this enables the inter-access point bitrate to be more accurately estimated, thereby to provide data upon which a data routing decision may be made. Preferably, the data collected as a result of generating diagnostic traffic and measuring the rate of data transfer between access points is shared within the wireless network. For example, the data collected may be shared via a broadcast or via unicast packets to other access points and/or universal repeaters in a wireless network. Advantageously, by sharing this data, the decision as to how data transmission is routed through a network is facilitated such that the best end-to-end transmission route is selected.

Hereinafter, a description of the functions performed by the UR 106 in order to determine an optimal data transmission route for the client 104 to communicate with the AP 103 is provided.

Figure 5:
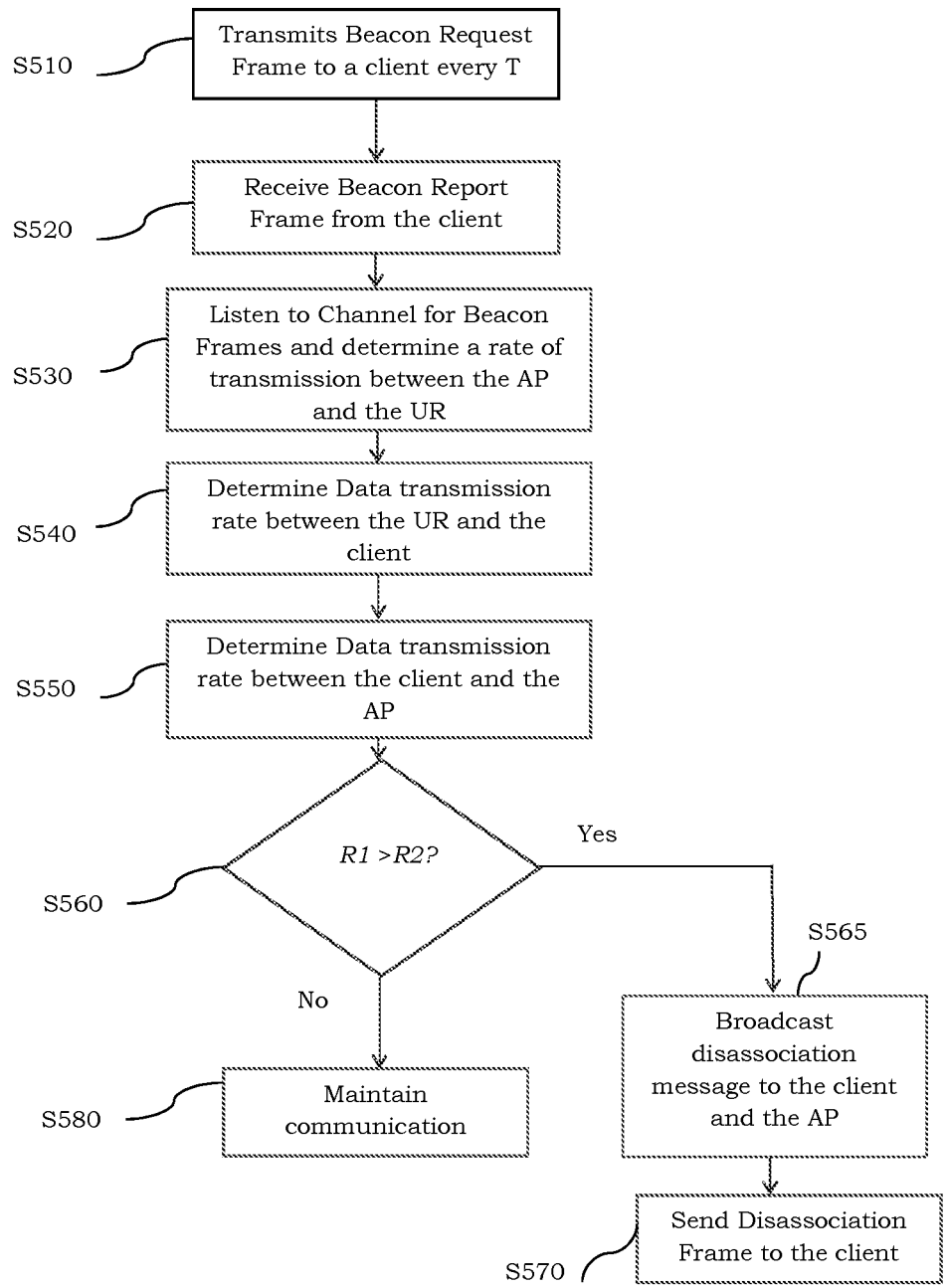
FIG. 5 is a flow chart illustrating a method implemented by a universal repeater, according to an example embodiment.

FIG. 5 is a flow chart illustrating a method implemented by a universal repeater, according to an example embodiment where the client 104 associated with the UR 106. At S510, the UR 106 transmits beacon request frames (BRqF) described above, to the client 104 every T seconds, where T is a configurable parameter. In one example embodiment, if there are more than one AP and/or UR present in the network and operating on different channels, the beacon request frame may specify the channel(s) that the client 104 should listen to and provide measurements on.

In one example embodiment, the UR 106 and the AP 103 operate at the same channel. Whenever the client 104 receives a BRqF from the UR 106, the client 104 then measures the beacon packets transmitted by the AP 103. The beacon packets transmitted by the AP 103 provide information about the RSSI value which is used to determine the data transmission rate on the link between the AP 103 and the client 104. In one example embodiment, the client 104 prepares BRsF that contains the MAC address and operating channel of the AP 106, and the corresponding RSSI value.

In one example embodiment, there may be multiple APs operating on different channels. Accordingly, the client 104 measures each channel, and collects beacon packet from each AP operating on each of the channels. The BRsF will then contain all MAC addresses and the operating channels of the APs, and the corresponding RSSI values as well. In one example embodiment and after preparing the report, the client 104 switches on the channel on which the UR 106 operates, and the report is sent back to the UR 106.

At S520, the UR 106 receives the BRsF prepared by the client 104. Based on the RSSI value, the UR 106 determines a data transmission rate between the client 104 and the AP 103, $R_1$, which may be referred to as the direct data transmission rate.

At S530, the UR 106 listens to the channel on which it operates for beacon packets received from the AP 103. By measuring the RSSI values by using the beacon packets received from the AP 103, the UR 106 determines a data transmission rate between the AP 103 and the UR 106. This rate may be designated as $r_1$.

At S540, the UR 106, using the BRsF received from the client 104 at S520, determines the data transmission rate between the UR 106 and the client 104. This rate may be designated as $r_2$.

At S550, the UR 106 determines a rate of data transmission between the client 104 and the AP 103 through the UR 106. This rate may be designated as $R_2$. In one example embodiment, $R_2$ is determined based on the following formula:

$$R_2 = \left(\frac{1}{r_1} + \frac{1}{r_2}\right)^{-1} \quad (1)$$

At S560, the UR 106 compares $R_1$ with $R_2$ and determines whether the client 104 should communicate directly with the AP 103 or whether it should communicate with the AP 103 through the UR 106.

If at S560, the UR 106 determines that $R_1$ is greater than $R_2$, then a direct communication between the AP 103 and the client 104 provides a higher data transmission rate. Accordingly at S565 and prior to sending a disassociation frame to the client 104, the UR 106 broadcasts a message to the AP 103 and/or the client 104 to announce that the UR 106 intends to disassociate itself from the client 104. Therefore, at S570, the UR 106 sends a disassociation frame to the client 104 and the client 104 disconnects from the UR 106 and directly communicates with the AP 103.

However, if at S560, the UR 106 determines that $R_1$ is less than $R_2$, then the process proceeds to S580 and the UR 106 maintains its communication with the client 104.

While the method of FIG. 5 has been described with respect to a WLAN network comprising a single AP, a single UR and one or more clients, the method is also applicable to example embodiments in which the WLAN network includes more than one UR. In such case, a general form of equation 1 is as follows. An example embodiment of a WLAN network with more than one UR will be further described with respect to FIG. 8.

$$R = \left(\frac{1}{r_1} + \frac{1}{r_2} + \ldots + \frac{1}{r_n}\right)^{-1} \quad (2)$$

Figure 6:
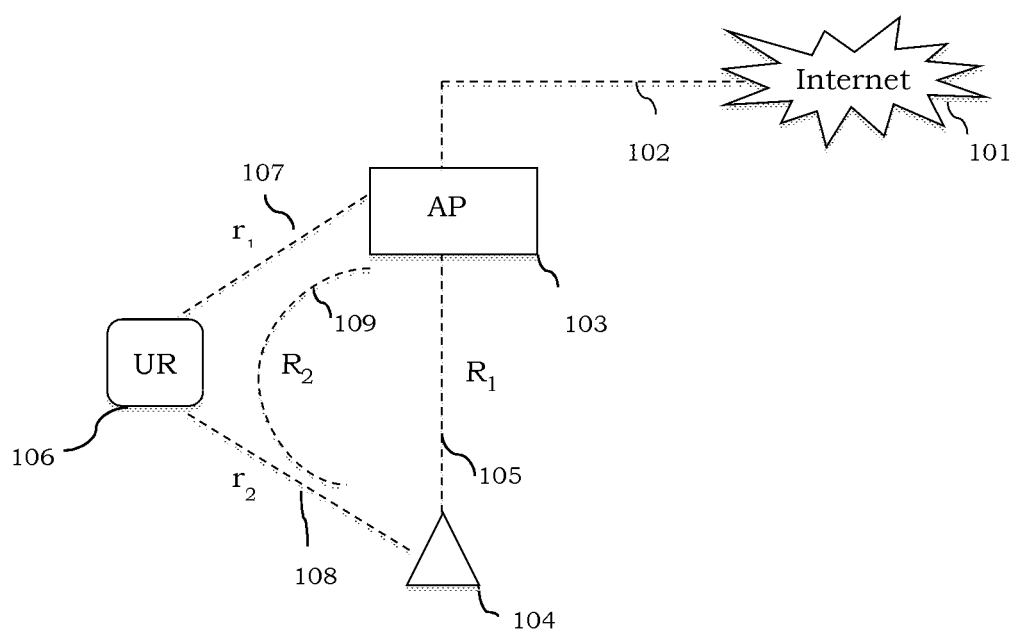
FIG. 6 is a simplified schematic diagram illustrating a wide local area network deployed in a home setting with a single client, a universal repeater and an access point, according to an example embodiment.
Figure 7:
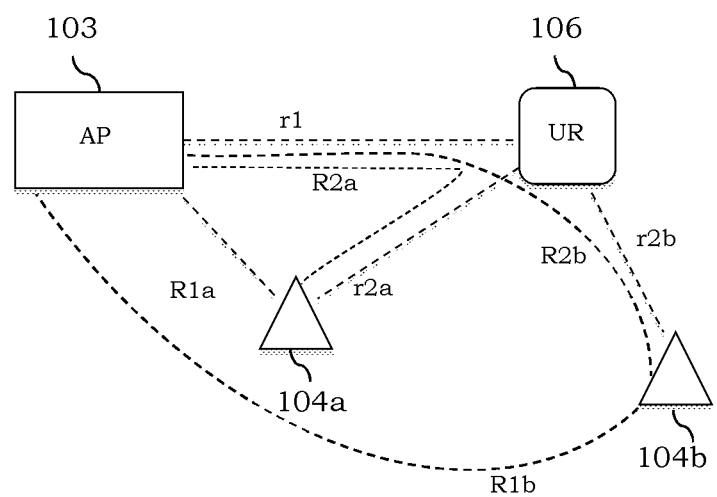
FIG. 7 is a simplified schematic diagram illustrating a wide local area network deployed in a home setting with two clients, a universal repeater and an access point, according to an example embodiment.
Figure 8:
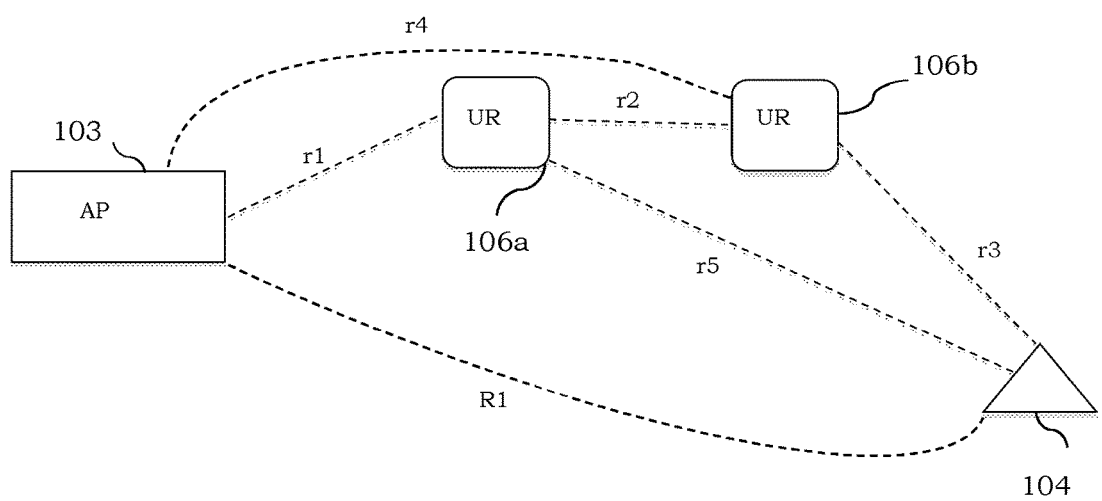
FIG. 8 is a simplified schematic diagram illustrating a wide local area network deployed in a home setting with a single client two universal repeaters and an access point, according to an example embodiment.

FIGS. 6-8 provide example embodiments of how the best data transmission route is chosen for a client to connect to AP and exchange data with the AP.

FIG. 6 is a simplified schematic diagram illustrating a wide local area network deployed in a home setting with a single client, a universal repeater and an access point, according to an example embodiment. As shown in FIG. 6, the UR 106 transmits BRqF to the client 104, as described above with respect to S510. Upon receiving a BRsF from the client 104, the UR 106 determines the rate of data transmission $R_1$ on the communication link 105 between the AP 103 and the client 104. As described above, the UR 106 determines $R_1$ using the RSSI values received in the BRsF from the client 104. Furthermore, based on the received RSSI values, the UR 106 determines the rate of data transmission $r_2$ on the communication link 108 between the UR 106 and the client 104. Furthermore, as described above, by listening to the channel for beacon frames transmitted by the AP 103, the UR 106 determines the rate of data transmission $r_1$ on the communication link 107 between the UR 106 and the AP 104. As described with respect to FIG. 1, the AP 103 connects to an external internet via appropriate links such as link 102.

Using equation (1) above, the UR 106 determines a rate of data transmission $R_2$ on the link 109 between the client 104 and the AP 103, which passes through the UR 106. By comparing $R_1$ and $R_2$, the UR 106 determines whether the data throughput on the link 105 is greater than the data throughput on the link 109 or not, and then chooses a communication link for the client 104, accordingly.

FIG. 7 is a simplified schematic diagram illustrating a wide local area network deployed in a home setting with two clients, a universal repeater and an access point, according to an example embodiment.

As shown in FIG. 7, assume that the WLAN network consists of the AP 103, the UR 106 and clients 104*a* and 104*b*. Further assume that upon receiving the BRsF from the clients 104*a* and 104*b*, the UR 106 determines the rates of data transmission on various links as follows. With respect to the client 104*a*, the rate of direct data transmission between the client 104*a* and the AP 103 (e.g., R1a) is 70 Mbps, the rate of data transmission between the UR 106 and the AP 103 (e.g., r1) is 100 Mbps and the rate of data transmission between the client 104a and the UR 106 (e.g., r2a) is 100 Mbps.

According to equation (1), the rate of data transmission between the client 104a and the AP 103, passing through the UR 106, (e.g., R2a) is 50 Mbps. Since R1a is greater than R2a, the UR 106 sends a disassociation signal to the client 104a and the client 104a connects to the AP 103 directly.

With respect to the client 104b, the rate of direct data transmission between the client 104b and the AP 103 (e.g., R1b) is 30 Mbps, the rate of data transmission between the UR 106 and the AP 103 (e.g., r1) is 100 Mbps and the rate of data transmission between the client 104b and the UR 106 (e.g., r2b) is 100 Mbps.

According to equation (1), the rate of data transmission between the client 104b and the AP 103, passing through the UR 106, (e.g., R2b) is 50 Mbps. Since R1b is smaller than R2b, the UR 106 does not send a disassociation signal and the client 104b continues to communicate with the AP 103 via the UR 106.

While not shown in FIG. 7, as described above, the AP 103 connects to an external internet via appropriate links such as link 102, as shown in FIG. 1.

FIG. 8 is a simplified schematic diagram illustrating a wide local area network deployed in a home setting with a single client two universal repeaters and an access point, according to an example embodiment.

The following are assumed with respect to the WLAN network shown in FIG. 8. The WLAN network includes AP 103, UR 106a, UR 106b, and the client 104. The rate of data transmission between the AP 103 and the UR 106a is designated as r1 and the rate of data transmission between the AP 103 and the UR 106b is designated as r4. The rate of data transmission between the UR 106a and 106b is designated as r2, the rate of data transmission between the UR 106b and the client 104 is designated as r3 and the rate of data transmission between the UR 106a and the client 104 is designated as r5. The rate of direct data transmission between the AP 103 and the client 104 is designated as R1.

Upon receiving the BRsF, UR 106a and 106b determine the following. Using equation (1), the UR 106a determines R2, which is a rate of data transmission between the client 104 and the AP 103 through the UR 106a, as follows:

$$R_2 = \left(\frac{1}{r_1} + \frac{1}{r_5}\right)^{-1} \quad (3)$$

Using equation (1), the UR 106b determines R3, which is a rate of data transmission between the client 104 and the AP 103 through the UR 106b, as follows:

$$R_3 = \left(\frac{1}{r_3} + \frac{1}{r_4}\right)^{-1} \quad (4)$$

Using equation (2), both UR 106a and 106b determine R4, which is a rate of data transmission between the client 104 and the AP 103 through the UR 106a and the UR 106b, as follows.

$$R_4 = \left(\frac{1}{r_1} + \frac{1}{r_2} + \frac{1}{r_3}\right)^{-1} \quad (5)$$

In one example embodiments, the UR 106a and 106b exchange the data transmission rates determined by each one. Each of the UR 106a and 106b, or in the alternative one of the UR 106a and 106b, compare R1 with R2, R3 and R4 and the appropriate communication link with the highest data throughput is chosen for the client 104 to communicate with the AP 103.

A person having ordinary skills in the art may easily expand the example embodiment described with reference to FIG. 8, to cover alternative scenarios in which the WLAN includes two or more URs and/or two or more clients.

Figure 9:
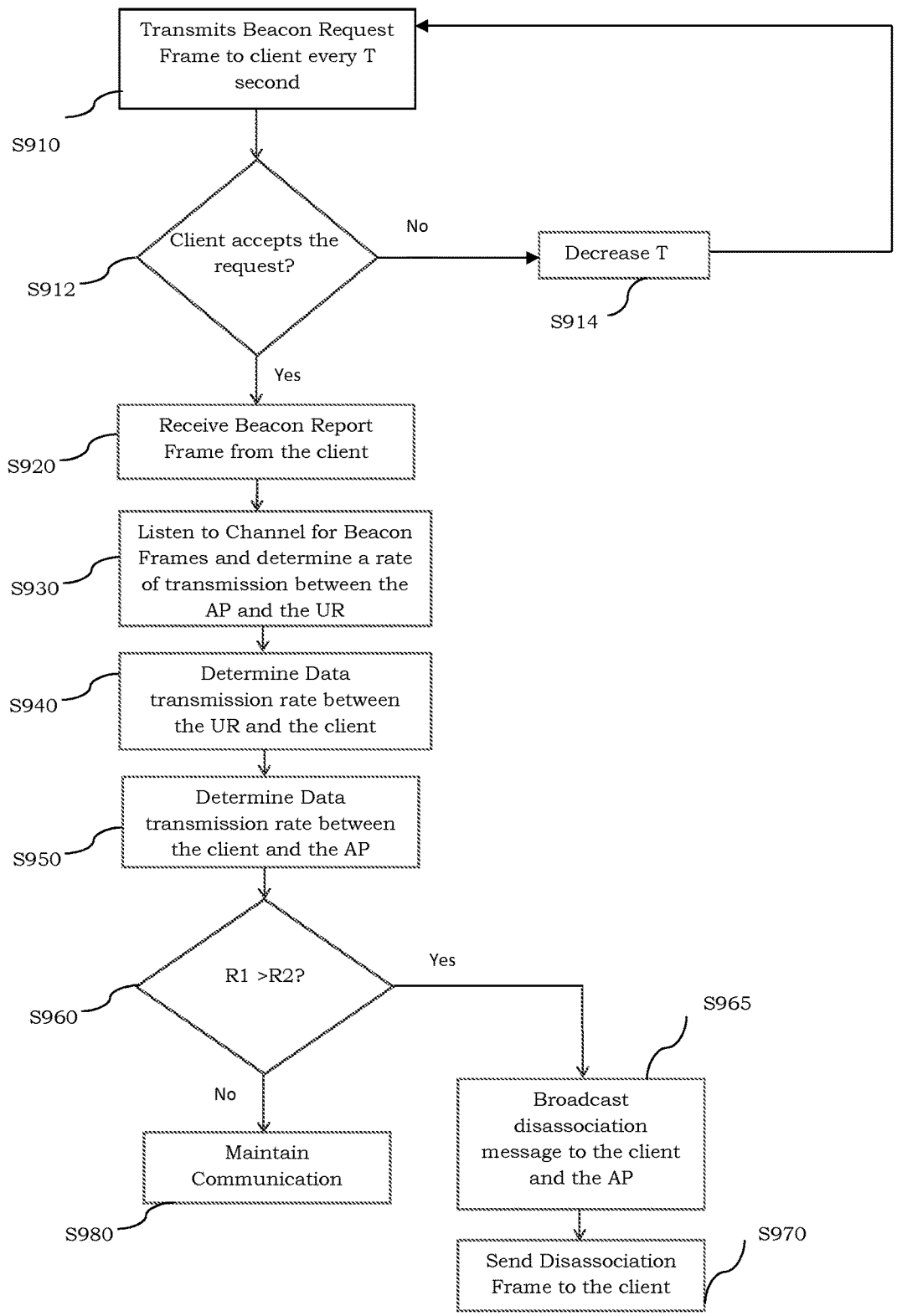
FIG. 9 is a flow chart illustrating a method implemented by a universal repeater including a learning feature, according to an example embodiment.

FIG. 9 is a flow chart illustrating a method implemented by a universal repeater including a learning feature, according to an example embodiment.

S910 is similar to S510 described above with reference to FIG. 5. At S912 the UR 106 checks to determine whether the BRqF is received and accepted by the client 104. If the UR 106 determines that the BRqF is not accepted by the client 104, the UR 106 determines that the duration T is too large for the client 104, and that the client is not willing to perform measurement for a large value of T. Then, at S914, the UR 106 decreases the value of T, and specifies the new value of T in the next BRqF, which is transmitted to the client 104 in the next round. The UR 106 continues to decrease T until the client 104 accepts it.

Once the client 104 receives the BRqF, the client 104 performs the following.

In one example embodiment, the client 104 receives the BRqF and from the UR 106. The client 104 then measures the beacon packets transmitted by the AP 103. The beacon packets transmitted by the AP 103 provide information about the RSSI value which is used to determine the transmission rate on the link between the AP 103 and the client 104. In one example embodiment, the client prepares BRsF that contains the MAC address and operating channel of the AP 103, and the corresponding RSSI value. In one example embodiment and after preparing the report, the client switches the channel on which the UR 106 operates, and the report is sent back to the UR 106.

In one example embodiment, there may be multiple APs operating on different channels. Accordingly, the client 104 measures each channel, and collects beacon packet from each AP operating on those channels. The BRsF will then contain all MAC addresses and the operating channels of the APs, and the corresponding RSSI values as well.

Thereafter, the process moves to S920-S980, which are the same as S520-S580, as described above with reference to FIG. 5.

The example WLAN networks described above include one or more URs to enhance the network coverage, mitigate negative effects of a wireless medium and provide alternative communication links for the clients to connect to the AP on.

In another example embodiment, two or more APs may be utilized to create a mesh network as will be described below. Each AP may be referred to as a mesh point (MP). A MP may be capable of making intelligent decisions such as routing in which the MP may change the direction of the communication according to some defined constraints. For instance, the MP may transmit data over the path which will provide the minimum contention or the maximum data throughput. However, a client usually associates with the closet MP since the closet MP's RSSI is higher than other MPs in the network. Hence, the end-end throughput does not usually take into account when an association decision is given, which causes the same inefficiency problem occurred in the network where a UR is used for range extension, as described in the Background Section.

Figure 10:
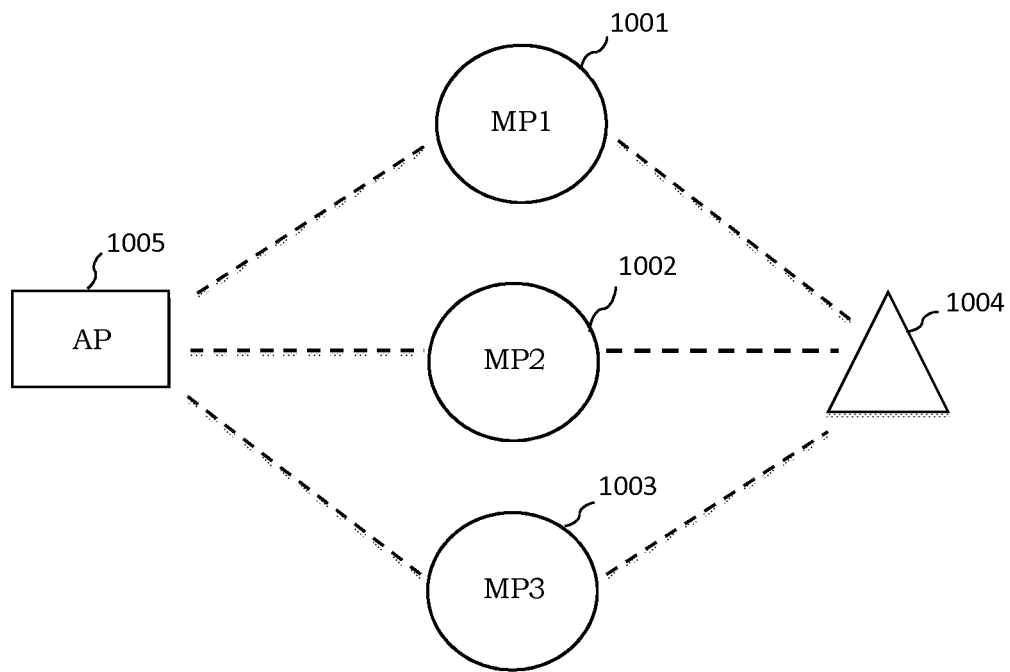
FIG. 10 is a schematic diagram illustrating a network including mesh points, according to an example embodiment.

FIG. 10 is a schematic diagram illustrating a network including mesh points, according to an example embodiment. As shown in FIG. 10, a WLAN includes three MPs 1001-1003, a client 1004 and an AP 1005. MPs 1001-1003 are connected to the AP 1005 wirelessly. The client 1004 may connect to the MPs 1001-1003 via wireless connections, or may connect to the AP 1005 directly without communication with the MPs 1001-1003. For a downlink scenario, the client 1004 receives data from the AP 1005 through the MPs 1001-1003, where the client 1004's data firsts arrives at one of the MPs 1001-1003, then the one of the MPs 1001-1003, transmits the data to the client 1004. For uplink scenario where the client 1004 wants to transmit data to the AP 1005 or a gateway, the client 1004 may transmit data directly to the AP 1005 or to one of the MPs 1001-1003. Then, the one of the MPs 1001-1003 transmits the data to the AP 1005 wirelessly. For both downlink and uplink scenarios, the end-to-end data throughput between the client 1004 and the AP 1005 is taken into account, and the decision of which one of the MPs 1001-1003 the client 1004 is to associate with is given with the knowledge of the various end-to-end data transmission rates.

While not shown in FIG. 10, according to one example embodiment, the client 1004 may establish a direct communication with the AP 1005 without going through one of the MPs 1001-1003.

Figure 11:
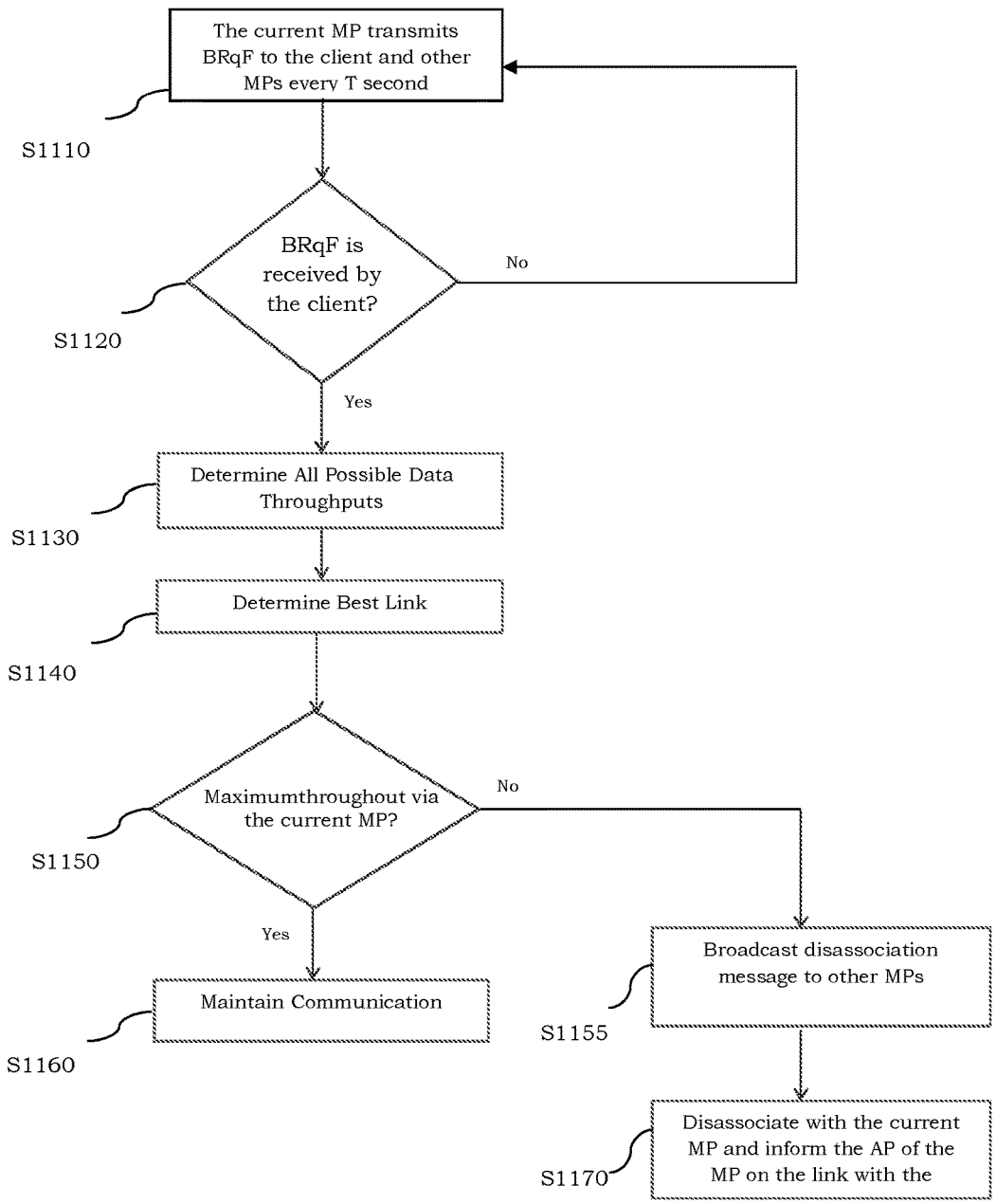
FIG. 11 is a flow chart illustrating a method implemented by the network of FIG. 10, according to an example embodiment.

FIG. 11 is a flow chart illustrating a method implemented by the network of FIG. 10, according to an example embodiment. In one example embodiment, the client 1004 is associated with one of the MPs 1001-1003 of FIG. 10, at a given time. Hereinafter and for the purposes of describing the method of FIG. 11, it is assumed that the client 1004 is currently associated with the MP 1001. However, the client 1004 may be associated with any of the other ones of the MPs 1001-1003.

At S1110, the MP 1001 transmits BRqF to the client 1004 and other MPs of the WLAN network (e.g., MP 1002 and 1003) every T seconds, where T is a reconfigurable system parameter. At S1120, the MP 1001 determines whether the BRqF is received by the client 1004 and/or other MPs 1002 and 1003. If the MP 1001 determines that the client 1004 and/or other MPs 1002 and 1003 have not received the BRqF, the MP 1001 keeps retransmitting the BRqF every T seconds until all of the other MPs 1002 and 1003 as well as the client 1004 receive the BRqF.

Similar to that described above with reference to FIG. 5, once the client 1004 receives the BRqF, the client 1004 collects beacon packets that the client 1004 receives from other MPs 1002 and 1003 as well as the AP 1005. The client 1004 observes the corresponding RSSI values. Then, the client prepares 802.11k BRsF which contains the information about the received beacon packets with the corresponding RSSI values, as described above, and sends it to the current MP 1001.

Furthermore, other MPs 1002 and 1003 also collect beacon packets received at each of the other MPs 1002 and 1003 from the AP 1005. In one example embodiment, similar to the client 1004, the other MPs 1002 and 1003 each prepare the BRsF and send the same to the current MP 1001. In another example embodiment, the other MPs 1002 and 1003 may indicate the signal strength of the beacon packets received from the AP 1005 in their own beacon packets and broadcast them.

At S1130, the current MP 1001 determines all possible end-to-end data throughputs on links between the AP 1005 and the client 1004, as shown in FIG. 10. The current MP 1001 determines all the end-to-end data throughputs by using the gathered data transmission rates provided in the corresponding beacon request report by the client 1004 and the other MPs 1002 and 1003.

At S1140, the current MP 1001 determines the best link with the maximum end-to-end data throughput based on the determination at S1130.

At S1150, the current MP 1001 determines whether the best link with the maximum end-to-end data throughput between the client 1004 and the AP 1005 is through the current MP 1001. If the current MP 1001 determines that the best link is through the current MP 1001, then at S1160, the client 1004 maintains connection with the AP 1005 through the current MP 1001.

If at S1150, the current MP 1001 determines that the best link with the maximum end-to-end data throughput between the client 1004 and the AP 1005 is through either a direct connection between the client 1004 and the AP 1005 or one of the other MPs 1002 and 1003, then at S1155 and prior to disassociating itself from the client 1004, the current MP 1001 broadcasts a message to the AP 1005 and other MPs 1002 and 1003 to announce that the MP 1001 intends to disassociate itself from the client 1004. Accordingly, the other MPs 1002 and 1003 may put the current MP 1001 on what may be referred to as a "blacklist". The message broadcasted by the current MP 1001 may be a broadcast message, a multicast message or a unicast message addressed to each MP (e.g., 1002 and 1003) individually.

Thereafter, at S1170, the current MP 1001 informs the client 1004 that the current MP 1001 is disassociating itself from the client 1004. Thereafter, the client 1004 may establish the connection with the AP 1005 using the best link (i.e., either connect to the AP 1005 directly or through one of the other MPs 1002 and 1003 that provides the best link).

In one example embodiment, the current MP 1001 informs the client 1004 of the one of the other MPs with the highest end-to end data throughput via 802.11v packets. Other methods may be utilized by the MP 1001 to inform the client 1004. For example, the current MP 1001 may send BSS Transition Management Request Frame (BTMRF) which is defined within IEEE 8902.11v to the client 1004. Using the BTMRF, the current MP 1001 specifies one or more MAC addresses of the candidates MP(s) with the highest end-to-end data throughput (e.g., MP 1002 and/or MP 1003) with which the client 1004 may associate.

In one example embodiment, whenever the client 1004 receives the BTMRF from the current MP 1001, the client 1004 disassociates itself from the current MP 1001, associates with the MP which is specified in the BTMRF and provides the highest end-to-end data throughput.

The method described above with reference to FIG. 11 enables a steering (directing) of a client such as client 1004 towards an MP such as one of the MPs 1001 to 1003 and/or an AP 1005 that provides the best communication link with the highest end-to-end data throughput.

In one example embodiment, the client 1004 may support neither IEEE 802.11k, IEEE 802.11R nor IEEE 802.11v standards.

Figure 12:
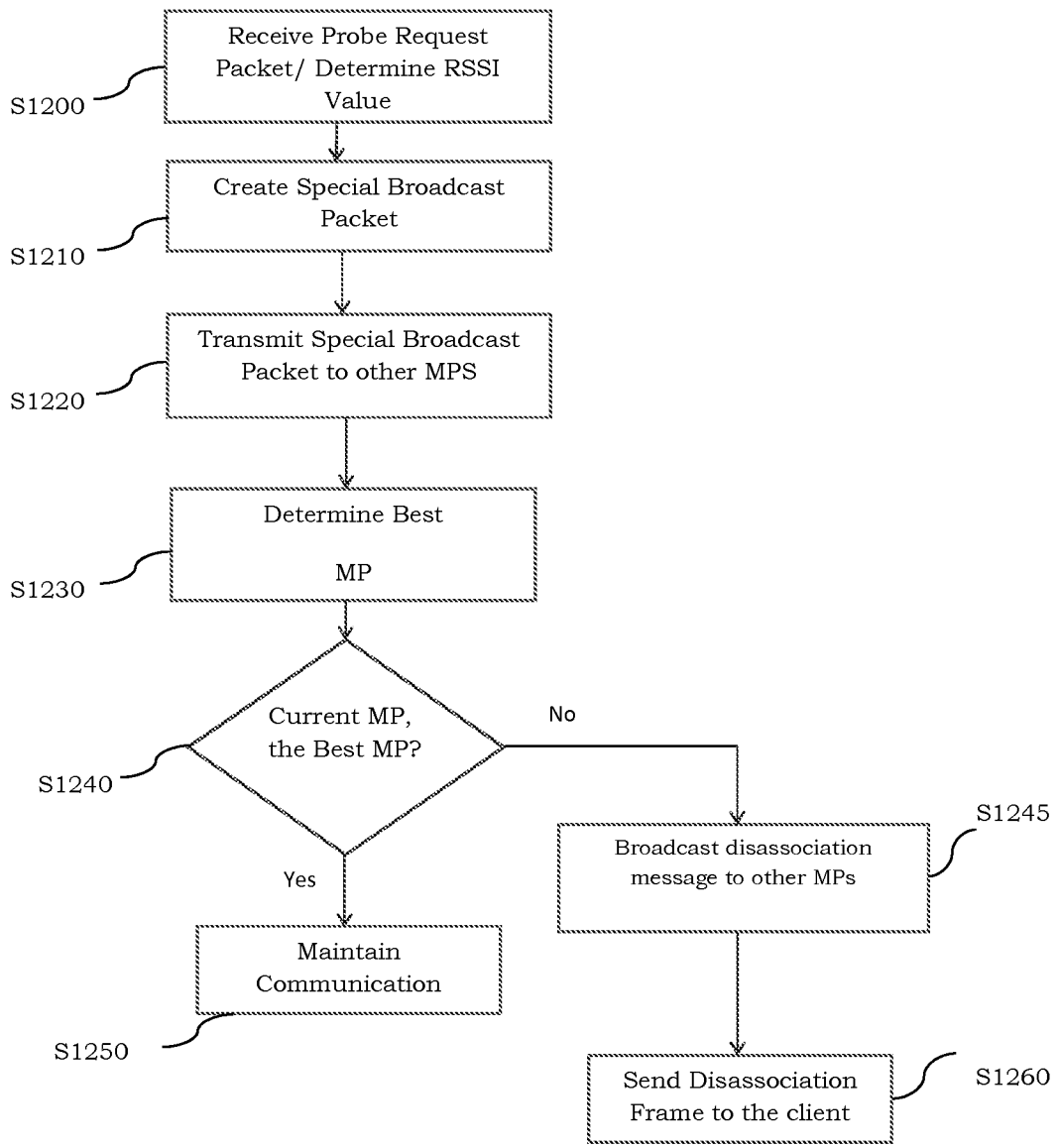
FIG. 12 is a flow chart illustrating a method implemented by the network of FIG. 10, according to an example embodiment.

FIG. 12 is a flow chart illustrating a method implemented by the network of FIG. 10, according to an example embodiment.

Accordingly to FIG. 12 and with reference to FIG. 10, at S1200, whenever the client 1004 sends probe request packets to each MP (e.g., MPs 1001-1003 shown in FIG. 10), each MP receives the probe request packets and determines the corresponding RSSI value. At S1210, each MP creates a special broadcast packet (SBrC) that contains the source address (e.g., MAC address of the transmitting MP), the destination address which may be the broadcast address, and the MP's rate information associated with the client 1004. The rate information may contain the number of receive and transmit antennas of the MP, the communication standards supported by the MP (e.g., IEEE 802.11n and 802.11 ac standards) and the RSSI value of the client 1004 observed at each respective MP by using the probe request packets. The rate information is not limited to the above described parameters but may be extended without any performance degradation.

At S1220, each MP transmits the created special broadcast packet to other MPs in the network. Accordingly, each MP receives and decodes the special broadcast packet transmitted by other ones of the MPs and thus obtains information on transmission rate provided to the client 1004 by every MP (e.g., MPs 1001-1003).

At S1230, each MP may determine the best MP that provides a maximum end-to-end transmission rate for the client 1004 based on the obtained information on transmission rates between each MP and the client 1004.

At S1240 and based on the determination at S1230, a current one of the MPs 1001-1003 that is currently associated with the client 1004, determines whether the client 1004 is receiving the maximum end-to-end transmission rate from the current one of the MPs or whether another one of the MPs 1001-1003 provide the maximum end-to-end transmission rate.

If at S1240, the current one of the MPs 1001-1003 determines that it is currently providing the maximum end-to-end transmission for the client 1004, then at S1250, the current one of the MPs 1001-1003, maintains its connection with the client 1004.

However, if at S1240, the current one of the MPs 1001-1003 determines that it is not providing the maximum end-to-end transmission for the client 1004, then at S1245 and prior to disassociating itself from the client 1004, the current one of the MPs 1001-1003 broadcasts a message to the AP 1005 and other ones of the MPs 1001-1003 to announce that the current one of the MPs 1001-1003 intends to disassociate itself from the client 1004. Accordingly, the other ones of the MPs 1001-1003 may put the current one of the MPs 1001-1003 on what may be referred to as a "blacklist". The message broadcasted by the current one of the MPs 1001-1003 may be a broadcast message, a multicast message or a unicast message addressed to each MP individually.

Thereafter, at S1260, the current one of the MPs 1001-1003, sends a disassociation frame to the client 1004 in order to terminate the communication link between the current one of the MPs 1001-1003 and the client 1004.

Thereafter, the client 1004 may transmit further probe request frames to the MPs and one of the MPs with that provides the maximum end-to-end transmission rate may respond to the client 1004 with a probe response frame and then establish a communication link between itself and the client 1004.

In one example embodiment, a current one of the MPs currently serving the client 1004 (having an active communication link with the client 1004), may transmit an indication to other MPs in the network identifying the best one of the MPs providing the maximum end-to-end transmission rate for the client 1004. Therefore, upon receiving the special broadcast packet from the current one of the MPs, other MPs, ignore probe request packets of client 1004. Thereafter and assuming that the current one of the MPs is not the one providing the maximum end-to-end transmission rate for the client 1004, the current one of the MPs may automatically disassociate itself from the client 1004.

In one example embodiment, the current one of the MPs may provide this indication to other MPs in the network via a broadcast message, a multicast message or a unicast message addressed to each MP individually.

In one example embodiment and upon receiving the indication from the current one of the MPs, only the MP providing the maximum end-to-end transmission rate may receive and decode the probe request packet from the client 1004 and thereafter send a probe response frame to the client 1004.

In example embodiments described above in which the current one of the MPs provide an indication to other MPs identifying the best MP with a maximum end-to-end transmission rate, the rejection of the probe request (sent by the client 1004) by the MPs may be for a period of time (e.g., 3 seconds or any other length of time determined based on empirical studies). Accordingly, at any point of time, the current one of the MPs currently serving the client 1004, may actively monitor the available pathways between the client 1004 and the AP 1005 and choose a pathway with the maximum end-to-end transmission rate.

The method described above with reference to FIG. 12 enables a steering (directing) of a client such as client 1004 towards an MP such as one of the MPs 1001 to 1003 and/or an AP 1005 that provides the best communication link with the highest end-to-end data throughput.

The above method described with respect to FIG. 12, is also applicable to situations in which URs are deployed in the network.

In one example embodiment, the client 1004 associated with a MP or a UR, may support a dual band based MP or UR (e.g., the MP and/or the UR may support connections on the 2.4 GHz and 5 GHz frequency bands). Accordingly, a UR or an MP may switch the frequency band on which the client 1004 operates to another frequency band, when for example, the end-to-end transmission rate on a current band on which the client 1004 operates is worse than the end-to-end transmission rate on the other band.

In one example embodiment, the UR or the MP associated with the client 1004 may determine the end-to-end transmission rate on each band using the Clear Channel Assessment (CCA) function that is a carrier sensing mechanism defined by the IEEE 802.11 standards. The CCA may determine a length of the time during which a given one of the dual bands is idle for transmission and based thereon may determine the best one of the dual bands for transmission.

Accordingly, each dual-band MP and/or UR that serves the client 1004, may continuously monitor each of the dual bands and choose the one with the best transmission rate for the client 1004 to operate on. For example, when the MP or the UR that currently serves the client 1004 determines that the RSSI value on one band is higher than the other, the current MP or UR determines that the band with the higher RSSI is less congested. For example, when the communication between the client 1004 and the MP or UR is on a 2.4 GHz band and the MP or the UR determines that the RSSI value on the 5 GHz band is higher, then the MP or UR may send a disassociation signal to the client 1004 over the 2.4 GHz band. Thereafter, the client sends a new probe request over both the 2.4 GHz and 5 GHz bands.

Alternatively, the client 1004 may be banned from the 2.4 GHz band at MAC layer and the MAC layer packets transmitted by the client 1004 including probe request packets, may be dropped.

Thereafter, the MP or the UR may send a probe response over the 5 GHz band.

Therefore, example embodiments provide for not only the determination of the best channel (pathway) between the client 1004 and the AP 1005 but also for the determination of the best frequency band provided by the MP and/or the UR to the client 1004.

The example embodiments described above provide a solution to extend a coverage area of a WLAN network and provide a better rate of data transmission between the devices of such WLAN network and the AP of the WLAN network. One advantage of the example embodiments described above are improving network connectivity that may have otherwise been sub-optimal due to conditions of the wireless medium (e.g., presence of walls, etc., that negatively impact network connectivity). Another advantage of the example embodiments is to provide an alternative approach to increasing transmit power for extending the network coverage and improving the network connectivity, as described in the Background Section.

Variations of the example embodiments are not to be regarded as a departure from the spirit and scope of the example embodiments, and all such variations as would be apparent to one skilled in the art are intended to be included within the scope of this disclosure.

What is claimed:

1. An access point configured to provide access to a wireless local area network (WLAN), the access point comprising:
   a memory having computer readable instructions stored therein; and
   a processor, wherein execution of the computer readable instructions causes the processor to,
   determine a plurality of data transmission rates between at least one client associated with the access point and a further access point, via available communication routes within the wireless local area network,
   determine a best communication route, from among the available communication routes for the at least one client associated with the access point to communicate with the further access point based on the determined plurality of data transmission rates for the available communication routes, and
   steer the at least one client associated with the access point to communicate with the further access point via the determined best communication route by (i) broadcasting a disassociation message to the further access point and at least one other access point associated with the further access point indicating that the access point does not provide the best communication route, the disassociation message enabling the further access point to place the access point on a blacklist, and (ii) informing the at least one client that the access point is disassociating itself from the at least one client.

2. The access point of claim 1, wherein the execution of the computer readable instructions causes the processor to determine the best communication route based on an end-to-end throughput of data from the at least one client associated with the access point to the further access point via each of the available communication routes.

3. The access point of claim 1, wherein the plurality of data transmission rates include at least a first data transmission rate and a second data transmission rate, the first data transmission rate being a direct data transmission rate between the at least one client associated with the access point and the further access point and the second data transmission rate being a data transmission rate between the at least one client associated with the access point and the further access point via the access point.

4. The access point of claim 3, wherein the execution of the computer readable instructions causes the processor to determine the second data transmission rate based on the following formula:

$$R = \left(\frac{1}{r_1} + \frac{1}{r_2}\right)^{-1}$$

where R is the second data transmission rate, $r_1$ is a rate of data transmission between the access point and the further access point and $r_2$ is a rate of data transmission between the at least one client associated with the access point and the access point.

5. The access point of claim 4, wherein the execution of the computer readable instructions causes the processor to determine the best communication route by,
   comparing the first data transmission rate with the second data transmission rate, and
   selecting, based on the comparing, a communication route associated with one of the first data transmission rate and the second data transmission rate as the best communication route.

6. The access point of claim 5, wherein upon the processor determining that the first data transmission rate is greater than the second data transmission rate, the execution of the computer readable instructions causes the processor to select the communication route associated with the first data transmission rate.

7. The access point of claim 4, wherein the execution of the computer readable instructions causes the processor to determine r/based on a number of beacon packets transmitted by the further access point and received by the access point.

8. The access point of claim 3, wherein upon the wireless local area network including another device, the plurality of data transmission rates further include a third data transmission rate and a fourth data transmission rate, the third data transmission rate being a data transmission rate between the at least one client associated with the access point and the further access point via the another device and the fourth data transmission rate being a data transmission rate between the at least one client associated with the access point and the further access point via the access point and the another device.

9. The access point of claim 8, wherein the execution of the computer readable instructions causes the processor to determine the best communication route by,
   comparing the first through fourth data transmission rates, and
   selecting a communication route associated with one of the first through fourth data transmission rates, as the best communication route.

10. The access point of claim 1, wherein the execution of the computer readable instructions causes the processor to determine the plurality of data transmission rates by,
    generating diagnostic traffic between the further access point and the client associated with the access point, and recording estimated potential downlink rates between the further access point and the client associated with the access point.

11. The access point of claim 10, wherein the execution of the computer readable instructions causes the access point to broadcast the estimated potential downlink rates.

12. The access point of claim 10, wherein the execution of the computer readable instructions causes the access point to send the estimated potential downlink rates to a further access point.

13. The access point of claim 1, wherein the execution of the computer readable instructions causes the processor to determine the plurality of data transmission rates by,
transmitting a probe request to the at least one client associated with the access point, and
receiving a probe response from the at least one client associated with the access point, the probe response including information on a rate of data transmission between the at least one client associated with the access point and the further access point.

14. The access point of claim 13, wherein the execution of the computer readable instructions causes the processor to,
determine whether the transmitted probe request is received by the at least one client associated with the access point, and
retransmit the probe request in response to the processor determining that the at least one client associated with the access point has not received the transmitted probe request.

15. The access point of claim 14, wherein the execution of the computer readable instructions causes the access point to transmit a special broadcast packet that contains a source address and a destination address and end-to-end transmission rate information to another further access point.

16. The access point of claim 15, wherein the access point is a mesh access point configured to operate in a same manner as the further access point and connect wirelessly to another access point.

17. The access point of claim 15, wherein
the wireless local area network operates based on IEEE 80.2.11 standard.

18. The access point of claim 15, wherein the available communication routes enable the at least one client associated with the access point to communicate with at least one of a gateway, a wireless router, a satellite receiver, a video recorder set-up box and a network-attached storage device.

19. A wireless local area network (WLAN) comprising:
at least one access point including a memory having computer readable instructions stored therein and a processor, wherein execution of the computer readable instructions causes the processor to,
determine a plurality of data transmission rates between at least one client associated with the access point and a further access point, via available communication routes within the wireless local area network,
determine a best communication route, from among the available communication routes, for the at least one client associated with the access point to communicate with the further access point based on the determined plurality of data transmission rates for the available communication routes, and
steer the at least one client associated with the access point to communicate with the further access point via the determined best communication route by (i) broadcasting a disassociation message to the further access point and at least one other access point associated with the further access point indicating that the access point does not provide the best communication route, the disassociation message enabling the further access point to place the access point on a blacklist, and (ii) informing the at least one client that the access point is disassociating itself from the at least one client.

* * * * *